(12) United States Patent
McCarthy et al.

(10) Patent No.: US 9,505,880 B2
(45) Date of Patent: Nov. 29, 2016

(54) SYNTHESIS OF POLYFUNCTIONAL POLYOL ACRYLATES

(71) Applicant: Corning Incorporated, Corning, NY (US)

(72) Inventors: Kevin Robert McCarthy, Horseheads, NY (US); Weijun Niu, Painted Post, NY (US); David Neal Schissel, Painted Post, NY (US); Arthur Lawrence Wallace, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/259,390

(22) Filed: Apr. 23, 2014

(65) Prior Publication Data

US 2014/0357889 A1 Dec. 4, 2014

Related U.S. Application Data

(60) Provisional application No. 61/830,916, filed on Jun. 4, 2013.

(51) Int. Cl.
 *G02B 6/02* (2006.01)
 *C08G 65/332* (2006.01)

(52) U.S. Cl.
 CPC .................. *C08G 65/3322* (2013.01)

(58) Field of Classification Search
 CPC .................................................. C08G 65/3322
 USPC ........ 526/301; 427/163.2; 560/198; 385/145
 See application file for complete search history.

(56) References Cited

U.S. PATENT DOCUMENTS

| | | | | |
|---|---|---|---|---|
| 4,632,975 A | * | 12/1986 | Cornell | C07C 69/54 528/354 |
| 5,913,004 A | * | 6/1999 | Takase | C03C 25/106 385/123 |
| 2011/0130582 A1 | * | 6/2011 | Bette | C07C 67/08 554/2 |

FOREIGN PATENT DOCUMENTS

| | | |
|---|---|---|
| CN | 102491896 A | 6/2012 |
| CN | 102633635 A | 8/2012 |
| RU | 2387634 C1 | 4/2010 |

OTHER PUBLICATIONS

Zhang Rongguo et al., "The synthesis technique of polyacrylic acid superplasticizer", Journal of Wuhan University of Technology-Materials Science Edition, vol. 23, No. 6,. Dec. 2008, pp. 830-833.
Malucelli, G.; Gozzelino, G.; Ferrero, F.; Bongiovanni, R.; Priola, A. Synthesis of poly(propylene-glycol-diacrylates) and properties of the photocured networks. Journal of Applied Polymer Science (1997), 65(3), 491-497.

* cited by examiner

*Primary Examiner* — Kamal Saeed
*Assistant Examiner* — Janet L Coppins
(74) *Attorney, Agent, or Firm* — Kevin L. Bray

(57) ABSTRACT

A method of synthesizing urethane-free polyfunctional acrylate compounds. The method includes reaction of a polyol with acrylic acid in the presence of an inhibitor. A catalyst may also be present. The catalyst may be an acid and the inhibitor may be a substituted phenol compound. Excess acid may be removed by adding a salt and excess water may be removed by adding a drying agent. The reaction converts alcohol groups of the polyol to acrylate groups to provide a radiation-curable polyfunctional acrylate compound. The reaction is applicable to polyols generally and provides a scalable high yield process for forming urethane-free polyfunctional acrylates over a wide range of molecular weights. Coatings made from the acrylate products exhibit modulus and tensile strength characteristics favorable for primary fiber coatings.

30 Claims, No Drawings

SYNTHESIS OF POLYFUNCTIONAL POLYOL ACRYLATES

This application claims the benefit of priority under 35 U.S.C. §119 of U.S. Provisional Application Ser. No. 61/830,916 filed on Jun. 4, 2013, the content of which is relied upon and incorporated herein by reference in its entirety.

FIELD OF THE DISCLOSURE

This disclosure pertains to radiation-curable coating compositions for optical fibers. More particularly, this disclosure pertains to polyfunctional acrylate monomers and oligomers. Most particularly, this disclosure pertains to a low cost method of synthesis of high purity, urethane-free polyfunctional acrylate monomers and oligomers that may be used as radiation-curable components in fiber coating compositions.

BACKGROUND OF THE DISCLOSURE

The light transmitting performance of an optical fiber is highly dependent upon the properties of the polymer coating that is applied to the fiber during manufacturing. Typically a dual-layer coating system is used where a soft primary coating is in contact with the glass fiber and a harder secondary coating surrounds the primary coating. The harder secondary coating protects the fiber from damage caused by external forces and allows the fiber to be handled without concern of breakage. The softer primary coating dissipates forces that reach the interior of the coated fiber and prevents them from being transferred to the fiber. The primary coating is especially important in dissipating stresses that arise when the fiber is bent. The influence of bending stresses on the fiber needs to be minimized because bending stresses create local perturbations in the refractive index profile of the glass fiber that act to attenuate the intensity of light guided by the fiber. By dissipating stresses, the primary coating minimizes bend-induced attenuation losses.

The functional requirements of the primary coating impose various performance specifications on the materials that are used as primary coatings. The Young's modulus of the primary coating generally needs to be less than 1 MPa, and preferably less than 0.5 MPa, to provide the necessary force dissipation. The glass transition temperature of the primary coating also needs to be less than 0° C., and preferably less than −20° C., to ensure that the primary coating remains soft when the fiber is subjected to low temperatures, such as those that arise in the field in cold climates. In order to ensure uniform deposition on the glass fiber, the primary coating is applied to the glass fiber in liquid form. From a process throughput viewpoint, it is desirable to form the secondary coating on the primary coating as quickly as possible. The desire for high process throughput necessitates use of a primary liquid composition that reacts or cures quickly to form a solid coating that has sufficient mechanical integrity to support application of the secondary coating. In addition, the tensile strength of the solidified primary coating must be high enough to prevent tearing defects during the fiber draw process or post-draw processing of the coated fiber during cabling and installation. Achieving adequate tensile strength is a particular challenge for the primary coating because tensile strength generally decreases as the modulus of the coating material decreases and the force-dissipating function of the primary coating is best achieved with a low modulus material.

In order to meet the performance requirements, primary coating compositions are usually formulated as mixtures of radiation-curable urethane acrylate oligomers and radiation-curable acrylate-functionalized monomer diluents. Upon exposure to light in the presence of a photoinitiator, the acrylate groups rapidly polymerize to form a crosslinked polymer network, which is further strengthened by hydrogen bonding interactions that occur between urethane groups along the oligomer backbone. By varying the urethane acrylate oligomer, it is possible to form primary coatings having very low modulus values, while maintaining sufficient tensile strength. The drawback to coatings based on radiation-curable urethane acrylate oligomers is cost. The desire to improve the economics of the fiber coating process has motivated a search for alternatives to radiation-curable urethane/acrylate oligomers as constituents in the coating formulation.

Non-radiation-curable thermoplastic hard/soft block co-polymers with urethane groups have been proposed as strength additives to a crosslinked radiation-curable all-acrylic optical fiber coating. A high molecular weight thermoplastic additive with urethane groups is expected to entangle within the acrylic network and hydrogen bonding interactions between urethane groups are expected to provide structural reinforcement to the coating to improve tensile strength. The ability to control tensile strength through the level of loading of urethane-containing thermoplastic strength additives is also expected. However, the strong intermolecular self-interactions in urethane-containing thermoplastic additives, especially in the generally higher molecular weight materials that are commercially available and economical, could limit the amount of urethane-containing additive that can mix homogeneously with most acrylic functional coating components. High loading of high molecular weight urethane-containing thermoplastic additives in the liquid primary coating composition may also significantly increase the viscosity of the composition, which could lead to non-uniform coverage of the primary composition on the glass fiber during the coating application process.

Radiation-curable optical fiber coatings having low modulus values and low glass transition temperatures can be prepared using acrylate-functionalized monomers and/or oligomers without urethane groups (e.g. polyalkylene glycol diacrylates). Coating compositions based on acrylate-functionalized monomers and/or oligomers can be used to prepare fiber coatings with good tensile strength. The modulus of the coating can be controlled through the molecular weight of the acrylate-functionalized monomer or oligomer. For primary coatings, low modulus values are desired and may be achieved by curing coating compositions based on higher molecular weight acrylate-functionalized monomers or oligomers. Higher molecular weight acrylate-functionalized monomers or oligomers also provide the lower glass transition temperatures desired for primary coatings. Higher molecular weight urethane-free, acrylate-functionalized starting materials, however, have limited commercial availability. In order to extend the use of urethane-free acrylate-functionalized monomers and oligomers to primary fiber coatings, it is necessary to have wide commercial availability of urethane-free acrylate-functionalized monomers and oligomers.

SUMMARY

This disclosure provides a method of synthesizing monofunctional or polyfunctional acrylates. The monofunctional or polyfunctional acrylates may be used as monomers or oligomers in radiation-curable coating compositions. The method includes reacting a composition that includes a carboxylic acid, a polyol and an inhibitor. The reaction may be induced by heating the composition. The method may include adding a base and/or a drying agent to the heated composition. The method may include contacting the reacted composition with ion exchange resins or filtering the reacted composition through diatomaceous earth.

The carboxylic acid may include an alkene group. The alkene group may be a terminal alkene group. The carboxylic acid may be acrylic acid or methacrylic acid. The carboxylic acid may be a substituted variation of acrylic acid or methacrylic acid.

The polyol may be a compound with two or more alcohol groups, or three or more alcohol groups, or four or more alcohol groups. The polyol may be a poly(alkylene oxide) compound, such as poly(ethylene glycol) or polypropylene oxide). The polyol may have a molecular weight of at least 100 g/mol, or at least 500 g/mol, or at least 750 g/mol, or at least 1000 g/mol, or at least 1500 g/mol, or at least 2000 g/mol, or at least 4000 g/mol, or at least 6000 g/mol.

The inhibitor may stabilize the acrylate product formed in the reaction. The stabilization may include inhibiting premature reaction of one or more acrylate groups of the acrylate product. The inhibitor may be an alcohol, or an aromatic alcohol, or a phenol, or a substituted phenol. The substituted phenol may be substituted with one or more alkyl groups. The alkyl groups may have two or more carbons, or three or more carbons, or four or more carbons, or five or more carbons. Substitution of phenol may occur at the 2-position, or the 6-position, or the 2- and 6-positions, or the 4-position, or the 2-, 4-, and 6-positions. The inhibitor may be 2,6-di-t-butylphenol, or 2,6-di-t-butylphenol with further substitution at the 4-position. The substituted phenol may include a single OH substituent directly bonded to the aromatic ring, or a combination of a single OH substituent directly bonded to the aromatic ring and one or more alkyl substituents directly bonded to the aromatic ring.

The product formed in the reaction between the acid and the polyol may be a polyol monoacrylate, or a polyol diacrylate, or a polyol triacrylate, or a polyol tetraacrylate. The product formed in the reaction between the acid and the polyol may be a monomer or an oligomer. The reaction product may have a molecular weight of at least 100 g/mol, or at least 500 g/mol, or at least 750 g/mol, or at least 1000 g/mol, or at least 1500 g/mol, or at least 2000 g/mol, or at least 4000 g/mol, or at least 6000 g/mol.

The base may neutralize excess or unreacted carboxylic acid. The base may be a soluble salt. The soluble salt may be a carbonate, or a hydroxide, or the salt of the conjugate base of a weak acid, or the salt of an organic acid.

The drying agent may remove water formed in the neutralization reaction of the carboxylic acid. The drying agent may be a salt or an anhydrous salt. The salt or anhydrous salt may be a carbonate salt, or a sulfate salt, or a nitrate salt, or a halide salt.

The method may include filtration of the reacted composition through diatomaceous earth to remove inorganic salts.

Ion exchange resins may be used to remove excess or unreacted carboxylic acid from the reacted composition. The ion exchange resins may be configured as beads and may be surface functionalized. The surface functionalization may include amine functionalization. The amine functionalization may be functionalization with a tertiary amine. Surface amine groups may extract carboxylic acids from the reacted composition by forming a quaternary ammonium carboxylate salt.

The composition may further include a catalyst. The catalyst may be an acid. The acid may be a sulfonic acid. The sulfonic acid may be p-toluenesulfonic acid or methanesulfonic acid.

The polyol acrylate reaction product may have an acid number less than 5 mg KOH/g, or less than 3 mg KOH/g, or less than 2 mg KOH/g, or less than 1 mg KOH/g. The polyol acrylate may have a water content less than 2000 ppm, or less than 1000 ppm, or less than 500 ppm, or less than 300 ppm, or less than 200 ppm. The polyol acrylate reaction product may have an OH number less than 10, or less than 8, or less than 6, or less than 5, or less than 4, or less than 3.

The present disclosure extends to:

A method of making an acrylate compound comprising:
providing a composition, said composition including:
a carboxylic acid, said carboxylic acid comprising an alkene group;
a polyol, said polyol having a molecular weight of 750 g/mol or greater; and
an inhibitor, said inhibitor comprising an alkyl-substituted phenol said substituted phenol compound including only one OH group directly bonded to the aromatic ring;
heating said composition, said heating inducing a reaction between said acid and said polyol; and
adding a base and a drying agent to said reacted composition.

The present disclosure extends to:

A method of making an acrylate compound comprising:
providing a composition, said composition including:
a carboxylic acid, said carboxylic acid comprising an alkene group;
a polyol, said polyol having a molecular weight of 750 g/mol or greater; and
an inhibitor, said inhibitor comprising an alkyl-substituted phenol said substituted phenol compound including only one OH group directly bonded to the aromatic ring;
heating said composition, said heating inducing a reaction between said acid and said polyol; and
contacting said reacted composition with ion exchange resins.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

The present disclosure addresses the need for urethane-free monofunctional and polyfunctional acrylate compounds as components for radiation-curable coating compositions. The coating compositions may be used to provide coatings for optical fibers. Urethane-free compounds are desirable replacements for expensive urethane acrylate monomers and oligomers that are currently in wide use for primary and secondary coatings of optical fibers. The present disclosure recognizes the need for economically-viable substitutes for urethane acrylate monomers and oligomers and provides a method of synthesis of urethane-free monofunctional and polyfunctional acrylate compounds. The urethane-free monofunctional and polyfunctional acrylate compounds may be polyol acrylate compounds.

Polyfunctional polyol acrylates may be diacrylates, triacrylates, tetraacrylates, or higher acrylates. Illustrative structures of polyol monoacrylates, diacrylates, polyol triacrylates, and polyol tetraacrylates are shown, respectively, in formulas I, II, III, and IV below:

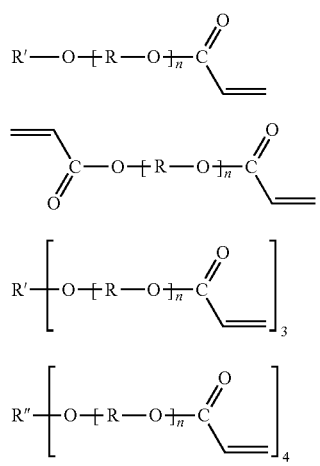

where R, R' and R" are organic groups, which may be linear or branched, substituted or unsubstituted, the same or different, and n is an integer that defines the number of repeat units. As used herein, the term "polyol acrylate" refers to a polyol acrylate compound with any degree of acrylation, including monoacrylation, diacrylation, triacrylation, tetraacrylation, or higher acrylation. The term "polyfunctional acrylate" refers to a polyol acrylate with a degree of acrylation of at least two (i.e. polyol diacrylates or higher). The value of n may be small or large and the polyol acrylates may be classified, in order of increasing n, as monomers, oligomers, or polymers. Although illustrative formulas I, II, III and IV indicate a single repeat unit —R—O—, it is understood that polyol acrylates may include one or more repeat units, which may occur in random or block configurations within the structure. A polyol acrylate may, for example, include a first repeat unit —$R_1$—O— and a second repeat unit —$R_2$—O—, where $R_1$ and $R_2$ are chemically distinct and the number of instances of the first repeat unit in the structure is the same or different than the number of instances of the second repeat unit in the structure. Polyol acrylates may include a chemically distinct third repeat unit —$R_3$—O—, or a chemically distinct fourth repeat unit —$R_4$—O— etc.

As is known in the art, when R is —$CH_2CH_2$—, the polyol acrylate may be referred to as a polyethylene glycol acrylate and when R is —$CH_2CH(CH_3)$—, the polyol acrylate may be referred to as a polypropylene glycol acrylate.

For other R groups, the polyol acrylates may similarly be identified according to naming nomenclature known in the art. When referring to specific polyol acrylates, it is customary in the art to refer to the compound by an abbreviated designation representing the R group (and/or R' or R" groups), an indication of the degree of acrylation (diacrylate, triacrylate, tetraacrylate, etc.), and an approximate molecular weight (an indication of the value of n). For example, the name PPGDA4000 refers to the compound polypropylene glycol diacrylate having a molecular weight of approximately 4000 g/mol.

The synthesis of polyol acrylates is known in the art. In the standard method, acrylic acid is reacted with a polyol in solution. A representative reaction scheme for the synthesis of PPGDA2000 is shown below:

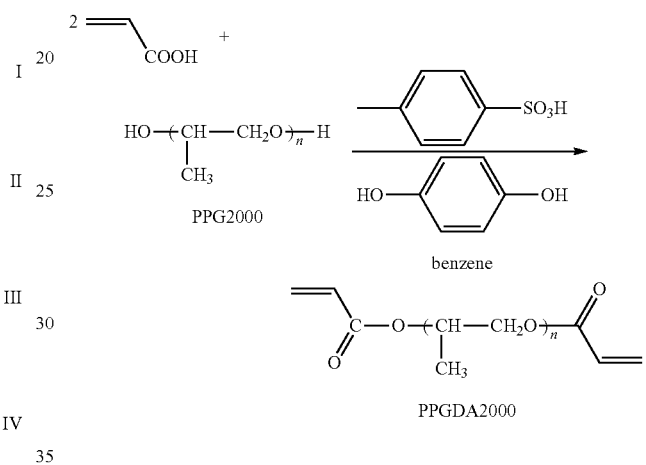

In the reaction, acrylic acid reacts with the polyol PPG2000 in benzene solvent to form PPGDA2000. p-Toluenesulfonic acid ($CH_3$—$C_6H_4$—$SO_3H$) is added as a catalyst and hydroquinone (HO—$C_6H_4$—OH) is added as an inhibitor. The components are heated and refluxed for several hours. During the reaction, water is removed with a Dean-Stark trap or other method. After reflux, the reaction mixture is cooled to 40° C. and anhydrous potassium carbonate is added with stirring for three hours to remove excess acids. The mixture is cooled to room temperature and filtered. The solvent is removed by evaporation under vacuum.

The prior art method suffers from a number of deficiencies. First, the PPGDA2000 product obtained has a red color. The red color is undesirable because it is imparted to coatings formed by curing compositions that contain PPGDA2000. Second, the PPGDA2000 product is difficult to separate from the potassium carbonate after the acid removal step. Filtration is impeded by the tendency of particulate matter in the reaction mixture to clog the filter. The clogging makes it difficult to scale the reaction up to the commercial volumes needed for an economically viable product. Third, the molecular weight of the PPGDA2000 product has been found to be less than the molecular weight of the PPG2000 polyol starting material. This makes the prior art reaction unpredictable and makes it difficult to design a reaction that provides a polyol acrylate product having a targeted molecular weight. The present inventors have repeated the prior art process and have confirmed the existence of each of the three deficiencies identified herein.

The present disclosure provides an improved method of synthesis of urethane-free monofunctional and polyfunctional acrylate compounds. The method includes inducing a reaction in a composition that includes a carboxylic acid, a polyol and an inhibitor. The reaction may be induced by heating the composition. The method may include adding a base and/or a drying agent to the reacted composition. The method may include contacting the reacted composition with an ion exchange resin or filtering the reacted composition through diatomaceous earth. The carboxylic acid may include an alkene group and the product of the reaction induced by heating may be a polyol acrylate compound. As is now explained, the method overcomes one or more of the difficulties identified in the prior art method of synthesis.

The present inventors believe that the red color observed in the PPGDA2000 product is a consequence of oxidation of the hydroquinone inhibitor used in the prior art reaction. Oxidation of hydroquinone may lead to the formation of colored compounds, such as benzoquinone, that may become contaminants in the polyol acrylate reaction product. Curing of coating compositions that include contaminated polyol acrylate compounds leads to colored coatings.

The present inventors have devised inhibitors that do not impart color to polyol acrylate products formed in reactions of alkene-containing carboxylic acids with polyols. The inhibitors may be less susceptible to oxidation than hydroquinone or, if oxidized, may produce oxidation products that are not colored. The expected site of oxidation of hydroquinone is at the position of one or both of the OH groups. The inhibitors of the present disclosure include protective groups that inhibit oxidation of OH groups. The protective groups may be substituent groups placed in close proximity to the position of the OH group. The protective group may be bonded to an atom directly bonded to the atom to which the OH group is bonded (e.g. nearest neighbor atom), or to atoms further removed from the atom to which the OH group is bonded (e.g. next nearest or high neighbor atom). The protective group may be bonded to a carbon atom immediately adjacent to the carbon atom to which the OH group is bonded (β-position), or to a carbon atom twice removed from the carbon atom to which the OH group is bonded (γ-position), or to carbon atoms still further removed from the carbon atom to which the OH group is bonded (δ-position, ε-position etc.).

The inhibitor may be an aromatic alcohol. The aromatic alcohol may be a monoalcohol or may include a single OH group directly bonded to the aromatic ring. The aromatic alcohol may be phenol. The alcohol may be a substituted phenol. The substituted phenol may include only one OH group directly bonded to the aromatic ring. The substituted phenol may include protective groups in the vicinity of the single OH group. Substitution of phenol with a protective group may occur at any position of the aromatic ring. Substitution of phenol with a protective group may occur, for example, at the 2-position, or the 6-position, or the 2- and 6-positions, or the 4-position, or the 2-, 4-, and 6-positions of the aromatic ring. The protective group may be a sterically bulky group that restricts access to or reduces the reactivity of the OH group. The protective group may be an alkyl group or a substituted alkyl group. The alkyl group may be branched. The alkyl group may have two or more carbons, or three or more carbons, or four or more carbons, or five or more carbons.

The inhibitor may be 2-t-butylphenol; or 2-t-butylphenol with further substitution at the 3-, 4-, 5- and/or 6-positions; or 2,6-di-t-butylphenol; or 2,6-di-t-butylphenol with further substitution at the 3-, 4-, and/or 5-positions; or 2,6-di-t-butyl-4-methylphenol.

The present inventors believe that the difficulties associated with filter clogging during separation of polyol acrylate products in the prior art are a consequence of the high water content present in the prior art reaction mixture. Water is produced in the acid neutralization step. In the reaction of PPG2000 with acrylic acid mentioned hereinabove, for example, acid neutralization is accomplished by adding potassium carbonate to the reaction mixture following the acrylation step. The potassium carbonate reacts with the p-toluenesulfonic acid catalyst and unreacted acrylic acid to produce water according to the following reactions:

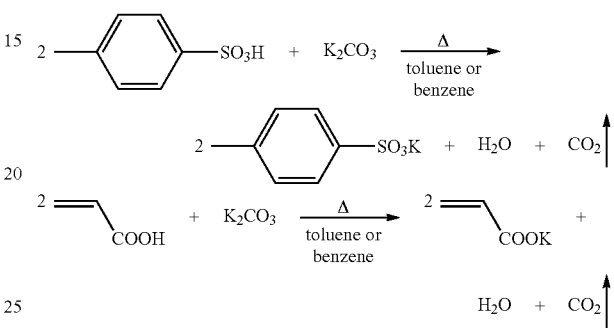

While not wishing to be bound by theory, the present inventors believe that the presence of significant amounts of water in the reaction mixture interferes with filtration. The presence of water leads to separation of an immiscible aqueous phase from the organic phase that includes the polyol acrylate product. Ordinarily, separation of aqueous and organic phases is readily accomplished with techniques known in the art. Such separation is problematic, however, in reactions that produce polyol acrylates because polyol acrylates have surfactant properties that act to at least partially emulsify the aqueous phase within the organic phase. The difficulties in separation become more pronounced as the molecular weight of the polyol acrylate product increases. The separation becomes particularly problematic if the molecular weight of the polyol acrylate product is greater than 750 g/mol and is more problematic still if the molecular weight of the polyol acrylate product is greater than 1000 g/mol.

To overcome the difficulties in separation, the reaction in accordance with the present disclosure includes a water-removal step. Inclusion of a water-removal step suppresses the formation of an aqueous phase and minimizes the emulsifying tendencies of the polyol acrylate product. As a result, filtration of the polyol acrylate product may be accomplished more readily and commercial scale up of the reaction becomes possible.

The water-removal step may occur after formation of the polyol acrylate product, or after addition of an acid neutralizing agent such as a base (e.g. potassium carbonate). Water-removal may be accomplished by adding a drying agent to the reaction mixture. The drying agent may be a salt, or an anhydrous salt. The salt or anhydrous salt may be a carbonate salt, or a sulphate salt, or a nitrate salt, or a halide salt. The drying agent may be activated molecular sieves.

The present inventors believe that the reduction in molecular weight of the polyol acrylate product relative to the polyol starting material observed in the prior art reaction is due to the occurrence of undesirable side reactions. The side reactions may degrade the polyol starting material and/or the polyol acrylate product during the process. While not wishing to be bound by theory, it is hypothesized that the presence of acids in the reaction mixture may react with ether linkages in the polyol starting material or polyol acrylate product and result in cleavage of ether linkages to produce lower molecular weight products.

The present inventors believe that the hydroquinone inhibitor used in the prior art reaction may be unstable during the course of the reaction and may become depleted through the reaction:

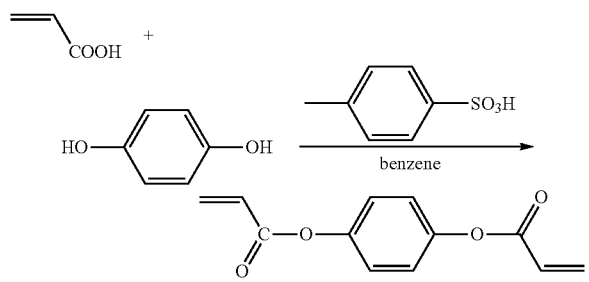

Depletion of the inhibitor is undesirable because it acts to enhance the stability of the polyol acrylate product formed in the reaction. The polyol acrylate product includes one or more acrylate groups that are susceptible to undesirable side reactions. One mechanism of side reaction is reaction of the acrylate groups with stray or excess free radicals that may be present in the reacted composition. The inhibitor may act to scavenge stray or excess free radicals and thereby promote the stability of acrylate groups on the polyol acrylate product. Through inclusion of protective groups designed to inhibit the reactivity of the OH group of the inhibitor, the inhibitors of the present disclosure are believed to remain stable throughout the acrylation reaction to better maintain the stability of the polyol acrylate product. It is also believed that the tendency of hydroquinone to undergo oxidation is facilitated by the direct bonding of two OH groups to the aromatic ring Inhibitors in accordance with the present disclosure may therefore include only one OH group directly bonded to the aromatic ring.

Acids in accordance with the present disclosure include carboxylic acids, or carboxylic acids containing alkene groups. The alkene group may be a terminal alkene group. Representative acids include acrylic acid, methacrylic acid, or substituted forms thereof.

The polyol may be a compound with two or more alcohol groups, or three or more alcohol groups, or four or more alcohol groups. The polyol may be a poly(alkylene oxide) compound, such as poly(ethylene glycol), or poly(propylene oxide), or poly(butylene oxide). The polyol may have the general structures

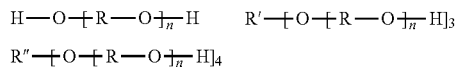

where R, R' and R" are organic groups, which may be linear or branched, substituted or unsubstituted, and n is an integer that defines the number of repeat units. R, R' and R" may include two or more carbon atoms, or three or more carbon atoms, or four or more carbon atoms, or five or more carbon atoms, or six or more carbon atoms, or eight or more carbon atoms, or ten or more carbon atoms. Without limitation, examples of polyols include polyethylene glycol, polypropylene glycol, and poly(1,2-butylene glycol), polytetramethylene glycol, and polytriethylene glycol, as well as methyl- or otherwise alkyl-substituted forms thereof. The polyol may have a molecular weight of at least 100 g/mol, or at least 500 g/mol, or at least 750 g/mol, or at least 1000 g/mol, or at least 1500 g/mol, or at least 2000 g/mol, or at least 4000 g/mol, or at least 6000 g/mol.

The base may neutralize excess or unreacted carboxylic acid. The base may be a soluble salt. The soluble salt may be a carbonate, or a hydroxide, or the salt of the conjugate base of a weak acid, or the salt of an organic acid.

The drying agent may remove water formed in the neutralization reaction of the carboxylic acid. Use of the drying agent facilitates direct filtration of the reacted composition and avoids separation of an aqueous phase and the need for liquid phase extraction. The drying agent may be a salt or an anhydrous salt. The salt or anhydrous salt may be a carbonate salt, or a sulfate salt, or a nitrate salt, or a halide salt. The drying agent may be molecular sieves.

The method may include filtration of the reacted composition through diatomaceous earth to remove inorganic salts. As is known in the art, diatomaceous earth is a finely-powdered silica-based filtering aid that is sold, for example, under the tradename Celite®.

As an alternative to neutralizing excess or unreacted carboxylic acid with a base, ion exchange resins may be used to remove excess or unreacted carboxylic acid from the reacted composition. The reacted composition may be placed in contact with ion exchange resins. The ion exchange resins may be configured as beads and may be surface functionalized. The surface functionalization may include amine functionalization. The amine functionalization may be functionalization with a tertiary amine. Surface amine groups may extract carboxylic acids from the reacted composition by forming a quaternary ammonium carboxylate salt. The surface of the ion exchange resins may be functionalized with $R_3N$ groups, where R is an alkyl substituent, and the $R_3N$ groups may remove carboxylic acids from the reacted composition by forming $R_3NH^+(R'COO^-)$. Removal of excess or unreacted carboxylic acid with ion exchange resins may avoid formation of water and facilitate separation by direct filtration.

The composition may further include a catalyst. The catalyst may be an acid. The acid may be a sulfonic acid. The sulfonic acid may be p-toluenesulfonic acid or methanesulfonic acid.

The reaction may convert the polyol to a polyol acrylate. The polyol acrylate may be a polyol monoacrylate, or a polyol diacrylate, or a polyol triacrylate, or a polyol tetraacrylate. The polyol acrylate may be urethane-free. As used herein, acid number is defined as the number of mg of KOH required to neutralize 1 g of polyol acrylate reaction product. The polyol acrylate may have an acid number less than 5 mg KOH/g, or less than 3 mg KOH/g, or less than 2 mg KOH/g, or less than 1 mg KOH/g. As used herein, water content is defined as the amount of water in the polyol acrylate reaction product as measured by KF test known in a procedure based on ASTM Standard D6304-07. The polyol acrylate may have a water content less than 2000 ppm, or less than 1000 ppm, or less than 500 ppm, or less than 300 ppm, or less than 200 ppm.

The OH number is a measure of the extent of reaction of the starting polyol material. A low OH number indicates more complete reaction of the OH groups of the polyol reactant and better conversion to a polyol acrylate product. As used herein, OH number is determined using a procedure based on ASTM Standard D4274-11. The procedure included preparing a phthalic anhydride pyridine reagent, treating a sample of the polyol acrylate product with the reagent, titrating with NaOH in the presence of phenolphthalein indicator, repeating for a blank, and calculating the OH number. The phthalic anhydride pyridine reagent was prepared by weighing 111 to 116 g of phthalic anhydride into a 1 L brown bottle, adding 700 mL of pyridine, shaking vigorously until dissolved, and allowing the reagent to stand overnight before use. If properly prepared, 25 mL of this reagent should consume between 95 and 100 mL of 0.5 N sodium hydroxide in the titration of the blank. The phenolphthalein indicator was prepared as a solution of 1 g of phenolphthalein in 100 mL of pyridine.

The amount (g) of polyol acrylate sample was determined by dividing 561 by the estimated hydroxyl number of the sample. The polyol acrylate sample was combined with 25 mL of the phthalic anhydride pyridine reagent in a flask and the flask was swirled until the sample dissolved. The flask was equipped with an air condenser and placed until immersed halfway in an oil bath maintained at 115±2° C. for 0.5 h. After heating, the assembly was removed from the bath and cooled to room temperature. The condenser was washed with 30 mL of redistilled pyridine and removed. The solution was transferred to a 250 mL conical flask, which was washed down with 20 mL of redistilled pyridine. 0.5 mL of the phenolphthalein indicator solution was added to the conical flask and the mixture was titrated with 0.5 N NaOH solution. Titration continued to a pink end point that persisted for at least 15 s. The procedure is repeated for a blank that omitted the polyol acrylate sample. To insure proper selection of the amount of polyol acrylate sample, the amount of 0.5 N NaOH needed to reach the titration end point of the polyol acrylate sample must be no more than 80% of the amount of 0.5 N NaOH needed to reach the titration end point of the blank. If this condition is not met, the sample size should be adjusted accordingly and the procedure repeated.

After completion of the titration, the OH number is determined as:

$$\text{OH Number} = \frac{[56.1\ N(B-A)]}{W}$$

where A is the amount (mL) of NaOH required for titration of the polyol acrylate sample, B is the amount (mL) of NaOH required for titration of the blank, N is the normality of the NaOH used in the titration, and W is the amount (g) of polyol acrylate sample used.

Based on the procedure above, thepolyol acrylate may have an OH number less than 10, or less than 8, or less than 6, or less than 5, or less than 4, or less than 3.

EXAMPLES

The following examples illustrate reaction procedures in accordance with the present disclosure. In the illustrative reaction, acrylic acid reacts with PPG2000 to produce PPGDA2000 as the reaction product according to the following scheme:

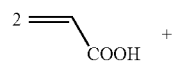

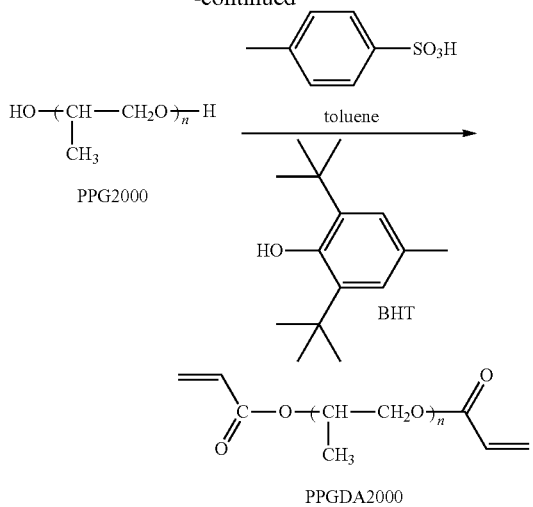

The reaction was conducted in toluene solvent. The reaction used p-toluenesulfonic acid as a catalyst, 2,6-di-t-butyl-4-methyltoluene (BHT) as an inhibitor, anhydrous $K_2CO_3$ as a base to neutralize excess acids, and anhydrous $Na_2SO_4$ as a drying agent. Filtration through diatomaceous earth was also completed to efficiently remove inorganic salts. Specific experimental details are now described.

Three trials of running the reaction above were completed. Except for the amount of anhydrous $Na_2SO_4$ used as a drying agent, the conditions of the three trials were identical. The procedure for trial A is as follows: PPG2000 (100.00 g, 50.00 mmol, $M_n$=2570 g/mol), acrylic acid (9.37 g, 130 mmol) and 2,6-di-tert-butyl-4-methylphenol (BHT) (0.15 g, 0.68 mmol) were transferred to a 500 mL flask fitted with a stir bar. To this flask, 150 mL of anhydrous toluene was added. The contents of the flask were refluxed for 2 hours. Under nitrogen protection, 1.90 g (10.00 mmol) of p-toluenesulfonic acid monohydrate was then added to the flask and a Dean-Stark trap fitted with a condenser was attached to the flask. The resulting mixture was refluxed for 40 hours and then cooled to 80° C. 13.82 g (100 mmol) of anhydrous potassium carbonate was added and the resulting mixture was stirred for 3 hours at 80° C. The mixture had a cloudy appearance. 12 g of anhydrous $Na_2SO_4$ was then added and the resulting mixture was stirred for 1 hour. The mixture was filtered through celite in a frit was carried out and the celite was washed with toluene rinse out residual reaction product (PPGDA2000). The toluene solvent was removed from the filtrate to yield a colorless liquid product. The colorless liquid product was dried under vacuum at 44° C. overnight to yield the oily product PPDGA2000 (99.37 g, 94%). $^1$H NMR indicated that no toluene remained in the final dried oily product. $^1$H NMR (300 MHz, $CD_2Cl_2$): δ 6.36 (d, 2 H), 6.11 (d, 2 H), 5.80 (d, 2 H), 5.11-4.99 (m, 2 H), 3.75-3.25 (m, 118 H), 1.28-1.03 (m, 118 H). GPC (THF): $M_n$=3,240 g/mol, $M_w$=4,070 g/mol, PDI (polydispersity index)=1.26. Water content=1848 ppm (based on the KF water content test using ASTM Standard D6304-07). Acid Number (mg KOH/g sample)=0.54. OH number (mg KOH/g sample)=2.9.

For trial B, 36 g of anhydrous $Na_2SO_4$ was used as the drying agent. The trial yielded 95.78 g PPGDA2000 (91%). For trial B, $^1$H NMR indicated that no toluene remained in the final dried oily product and the product characteristics were: GPC (THF): $M_n$=2,910 g/mol, $M_w$=3,680 g/mol, PDI (polydispersity index)=1.27; water content=319 ppm (based on the KF water content test using ASTM Standard D6304-07); acid number (mg KOH/g sample)=0.42. OH number (mg KOH/g sample)=3.5.

For trial C, 60 g of anhydrous $Na_2SO_4$ was used as the drying agent. The trial yielded 98.74 g PPGDA2000 (93%). For trial B, $^1H$ NMR indicated that no toluene remained in the final dried oily product and the product characteristics were: GPC (THF): $M_n$=2,940 g/mol, $M_w$=3,620 g/mol, PDI (polydispersity index)=1.23; water content=136 ppm (based on the KF water content test using ASTM Standard D6304-07); acid number (mg KOH/g sample)=0.34. OH number (mg KOH/g sample)=3.9.

The conditions for the three trials are summarized below:

| Trial | Acrylic acid (mmol) | PPG2000 (mmol) | BHT (mmol) | P-toluenesulfonic acid (mmol) | $K_2CO_3$(anhy) (mmol) | $Na_2SO_4$(anhy) (g) | KF water content (ppm) |
|---|---|---|---|---|---|---|---|
| A | 130 | 50.00 | 0.68 | 10.00 | 100 | 12 | 1848 |
| B | 130 | 50.00 | 0.68 | 10.00 | 100 | 36 | 319 |
| C | 130 | 50.00 | 0.68 | 10.00 | 100 | 60 | 136 |

The final product of each trial was colorless. The results show that the anhydrous $Na_2SO_4$ drying agent was effective at reducing the water content of the PPGDA2000 product. Separation of the reaction product by filtration was readily accomplished without clogging and efforts to scale the process up to 10 kg were successful. The increase in molecular weight observed for the PPGDA2000 polyol acrylate reaction product of each trial relative to the PPG2000 starting polyol material indicates that the reaction conditions do not promote acid degradation. The PPGDA2000 polyol acrylate reactions products feature low water content, low acid number, and low OH number.

Coatings were formed from compositions including the PPGDA2000 products of reaction trials A, B, and C. The compositions included the following components: 36 wt % PPGDA2000 monomer, 14 wt. % ethoxylated(4) nonylphenolacrylate monomer (SR504, available from Sartomer), 22 wt % isobornyl acrylate monomer (available from IGM Resins), 4 wt % caprolactone acrylate (SR 495, available from Sartomer), 21 wt % Oligomer 2 (prepared as described below), 3 wt % of 2,4,6-trimethylbenzoyl-diphenylphosphine oxide (a photoinitiator available as Lucirin TPO from BASF), 1 pph of 3-acryloxypropyl trimethoxysilane (an adhesion promoter available from Gelest), 1 pph of thiodiethylene bis(3,5-di-tert-butyl)-4-hydroxyhydrocinnamate (an antioxidant available from BASF), and 0.032 pph of pentaerythritol tetrakis(3-mercapto-propionate) (a strength additive available from Aldrich).

Oligomer 2 is a non-reactive branched urethane oligomer having the average structure:

$C[CH_2(CH_2CH_2CH_2O)_2$-H12MDI-P1200-H12MDI-BD-H12MDI-P1200-H12MDI-O$(CH_2)_2OBu]_4$, where H12MDI is 4,4'-methylenebis(cyclohexylisocyanate), P1200 is poly(propylene glycol) having $M_n$ of ~1200 g/mol, BD is 1,4-butanediol, and Bu is butyl.

Oligomer 2 was prepared according to the following procedure: a mixture of 207.3 g H12MDI, 400 g Photomer 4003 (nonyl phenol ethoxylated acrylate, available from IGM Resins), 1.6 g 2,6-di-t-butyl-4-methylphenol and 0.5 g dibutyltin dilaurate was prepared. 471 g of poly(propylene glycol) having an $M_n$ of 1200 was added dropwise to the mixture over a time period of approximately one hour. The reaction temperature was kept below 50° C. during the addition. When the addition was complete, residue in the addition funnel was flushed into the reactor with 25 g of Photomer 4003. The mixture was heated at approximately 70° C. for 1 h. Over 10 minutes, 17.75 g of 1,4-butanediol was added, followed by 25 g of Photomer 4003 to flush the addition funnel. The mixture was heated at approximately 70° C. for 1 h. Over 10 minutes, 23.3 g of 2-butoxyethanol was added, followed by 25 g of Photomer 4003 to flush the addition funnel. The mixture was heated at approximately 70° C. for 1 h. Over 10 minutes, 31 g of propoxylated pentaerythritol (PO/OH~17/8) with molecular weight 629 g/mol was added, followed by 25 g of Photomer 4003 to flush the addition funnel. The mixture was heated at approximately 70° C. for 1 h, at which point the formation of the oligomer was complete. Approximately 1197 g of oligomer (96% mass recovery) was isolated.

To form the coatings, the components of the coating composition were blended in the dark with mild heating until uniform. Films were prepared by drawing down the formulations on a glass plate using a 5 mil draw down bar. Films were cured using a Fusion D lamp with a nitrogen purge. The films received a dose of approximately 1350 mJ/cm$^2$. All samples were allowed to condition overnight in a controlled environment at 23° C. and 50% relative humidity. Tensile properties were measured using a Sintech MTS tensile tester. The gauge length used for testing was 5.1 cm and the test speed was 2.5 cm/minute. Tensile strength, % elongation (% strain at break), and Young's Modulus values were recorded. The properties of cured films made from compositions incorporating the PPGDA2000 reaction product of trials A, B, and C are summarized below:

| Source of PPGDA2000 | Tensile strength (MPa) (stdv.) | % Elongation (stdv.) | Young's modulus (MPa) (stdv.) |
|---|---|---|---|
| Trial A | 0.60 (0.04) | 96.49 (1.77) | 0.91 (0.04) |
| Trial B | 0.49 (0.05) | 88.48 (6.32) | 0.89 (0.01) |
| Trial C | 0.50 (0.07) | 93.94 (12.22) | 0.88 (0.07) |

The results indicate that high quality coatings were formed using the PPGDA2000 reaction product of each of the reaction trials.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the present embodiments. Since modifications combinations, sub-combinations and variations of the disclosed embodiments incorporating the spirit and substance of the present description may occur to persons skilled in the art, the description should be construed to include everything within the scope of the appended claims and their equivalents.

What is claimed is:

1. A method of making an acrylate compound comprising:
providing a composition, said composition including:
a carboxylic acid, said carboxylic acid comprising an alkene group;
a polyol, said polyol having a molecular weight of 750 g/mol or greater; and
an inhibitor, said inhibitor comprising a substituted phenol compound, said substituted phenol compound including only one OH group directly bonded to the aromatic ring;
heating said composition, said heating inducing a reaction between said acid and said polyol; and
treating said reacted composition, said treating including:
(i) adding a base and a drying agent to said reacted composition; or
(ii) contacting said reacted composition with ion exchange resins.

2. The method of claim 1, wherein said carboxylic acid is acrylic acid or methacrylic acid.

3. The method of claim 1, wherein said polyol includes a poly(alkylene oxide) compound.

4. The method of claim 1, wherein said polyol includes polypropylene glycol or polyethylene glycol.

5. The method of claim 1, wherein said polyol has a molecular weight of at least 1500 g/mol.

6. The method of claim 1, wherein said polyol includes three or more alcohol groups.

7. The method of claim 1, wherein said substituted phenol compound is an alkyl-substituted phenol compound.

8. The method of claim 1, wherein said substituted phenol compound is substituted at the 2-position.

9. The method of claim 8, wherein said substituted phenol compound is further substituted at the 6-position.

10. The method of claim 9, wherein the substituents at said 2-position and said 6-position are alkyl groups.

11. The method of claim 10, wherein said alkyl groups have three or more carbons.

12. The method of claim 1, wherein the product of said reaction comprises an acrylate compound.

13. The method of claim 12, wherein said acrylate compound is a polyol diacrylate compound.

14. The method of claim 12, wherein said acrylate compound is a polyol triacrylate compound.

15. The method of claim 12, wherein said acrylate compound has an acid number less than 3 mg KOH/g, a water content less than 1000 ppm, and an OH number less than 8.

16. The method of claim 1, wherein said composition further includes a catalyst, said catalyst comprising an acid.

17. The method of claim 1, wherein said base comprises a first salt.

18. The method of claim 17, wherein said drying agent comprises a second salt.

19. The method of claim 1, wherein said treating includes contacting said reacted composition with ion exchange resins and said ion exchange resins are surface-functionalized with an amine.

20. A method of making an acrylate compound comprising:
providing a composition, said composition including:
a carboxylic acid, said carboxylic acid comprising an alkene group;
a polyol, said polyol having a molecular weight of 750 g/mol or greater; and
an inhibitor, said inhibitor comprising an alkyl-substituted phenol said substituted phenol compound including only one OH group directly bonded to the aromatic ring;
heating said composition, said heating inducing a reaction between said acid and said polyol; and
adding a base and a drying agent to said reacted composition.

21. A method of making an acrylate compound comprising:
providing a composition, said composition including:
a carboxylic acid, said carboxylic acid comprising an alkene group;
a polyol, said polyol having a molecular weight of 750 g/mol or greater; and
an inhibitor, said inhibitor comprising an alkyl-substituted phenol said substituted phenol compound including only one OH group directly bonded to the aromatic ring;
heating said composition, said heating inducing a reaction between said acid and said polyol; and
contacting said reacted composition with ion exchange resins.

22. The method of claim 1, wherein said composition lacks an isocyanate compound.

23. The method of claim 1, wherein said polyol is a compound selected from the group consisting of

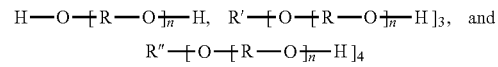

where R, R' and R" are organic groups and n is an integer.

24. The method of claim 20, wherein said polyol is a compound selected from the group consisting of

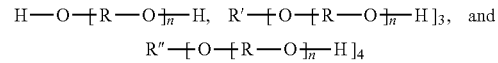

where R, R' and R" are organic groups and n is an integer.

25. The method of claim 20, wherein said polyol is a poly(alkylene oxide) compound.

26. The method of claim 20, wherein said polyol is poly(ethylene glycol), poly(propylene glycol), poly(1,2-butylene glycol), polytetramethylene glycol, or polytriethylene glycol.

27. The method of claim 1, wherein said drying agent is added as a solid to said reacted composition.

28. The method of claim 1, wherein said drying agent is anhydrous.

29. The method of claim 20, wherein said drying agent is added as a solid to said reacted composition.

30. The method of claim 20, wherein said drying agent is anhydrous.

* * * * *